United States Patent [19]
Cotreau et al.

[11] 3,789,700
[45] Feb. 5, 1974

[54] POSITIVE DRIVE ROLLER PLANETARY WAVE GENERATOR

[75] Inventors: Alex P. Cotreau, Burlington; John F. Jacobs, North Billerica, both of Mass.

[73] Assignee: USM Corporation, Boston, Mass.

[22] Filed: Apr. 4, 1972

[21] Appl. No.: 240,979

[52] U.S. Cl.................... 74/801, 74/640, 74/804
[51] Int. Cl. ..................... F16h 37/00, F16h 1/28
[58] Field of Search.............................. 74/801, 640

[56] References Cited
UNITED STATES PATENTS

| | | | |
|---|---|---|---|
| 3,182,525 | 5/1965 | Tinder et al. | 74/640 |
| 3,415,144 | 12/1968 | Corson | 74/640 |
| 3,524,362 | 8/1970 | Hugel | 74/640 X |
| 3,602,070 | 8/1971 | Verge | 74/804 |
| 2,966,808 | 1/1961 | Grudin | 74/801 X |
| 2,944,444 | 7/1960 | Burns | 74/801 |
| 3,216,270 | 11/1965 | Nasvytis | 74/801 X |
| 3,374,372 | 3/1968 | Tinder et al. | 74/640 X |

Primary Examiner—Arthur T. McKeon
Attorney, Agent, or Firm—Carl E. Johnson et al.

[57] ABSTRACT

In harmonic drive actuators a wave generator imparts circumferential rotation of a wave of radial deflection to a wave carrying member often termed a strain gear. The present planetary wave generator transmits such motion positively to provide constant speed ratio, and affords an economic planetary roller structure insuring good bearing life. The usage of ball-bearings is omitted, and tendency to skewing is minimized.

5 Claims, 4 Drawing Figures

Patented Feb. 5, 1974
3,789,700
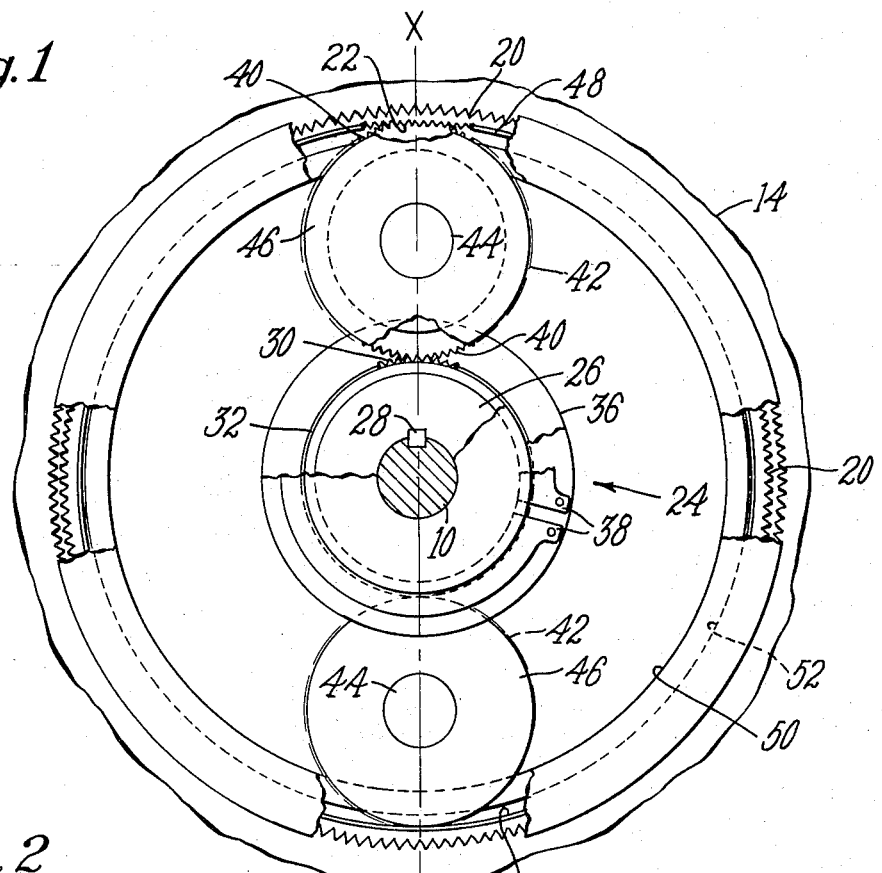
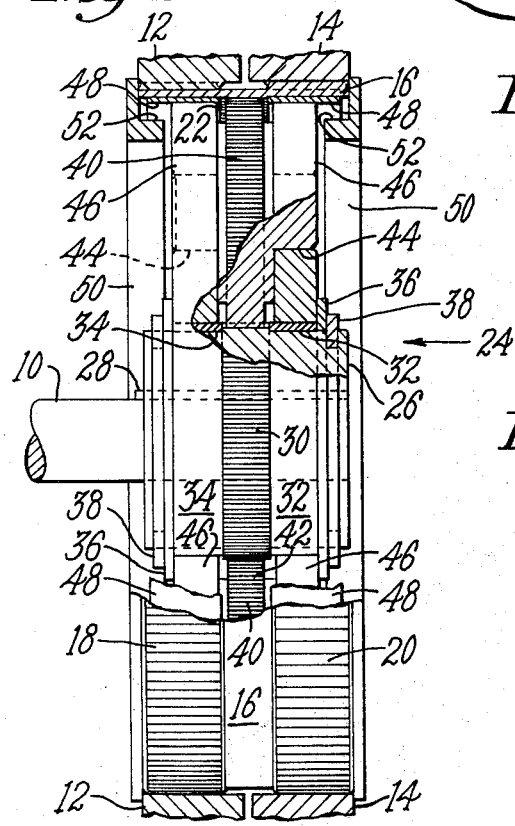
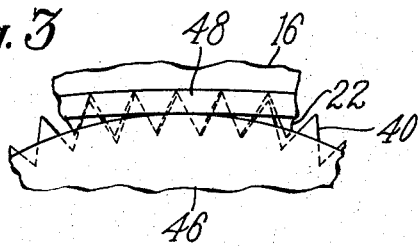
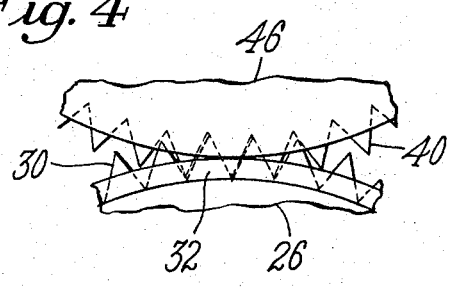

POSITIVE DRIVE ROLLER PLANETARY WAVE GENERATOR

CROSS REFERENCE TO RELATED APPLICATION

An application Ser. No. 191,371, now abandoned, filed Oct. 21, 1971 in the names of A. P. Cotreau and R. A. Sayce pertains to a hoist which is, or may be, one illustrative embodiment for the load-carrying capability of a planetary wave generator of the type hereinafter to be disclosed.

BACKGROUND OF THE INVENTION

This invention relates to motion transmission of the harmonic drive type generally as disclosed, for example, in U.S. Letters Patent No. 2,906,143 issued Sept. 29, 1959, in the name of C. W. Musser. More particularly, the present invention is concerned with the wave generator portion of a mechanical harominic drive actuator whereby a rotary lobar shape is imparted to a tubular, radially deflectible member coaxial with the wave generator means. The deflectible member is commonly formed with circumferential spline teeth and termed a flexspline. The mechanical type of harmonic drive actuator additionally comprises a third basic element, namely a circular member usually having spline teeth and hence termed a circular spline. In the more common arrangement the wave generating means is disposed within the flexspline to effect intermeshing of its spline teeth with those of the circular spline (which commonly differ in number) at circumferentially spaced localities. A novel wave generator construction applicable to that arrangement is herein disclosed, it being understood that it is in principal equally applicable to an inverted harmonic drive unit wherein the wave generator means is disposed externally. The present disclousre is of the two-lobe or elliptoidal harmonic drice arrangement merely for purposes of simplicity in illustration.

In the prior art wave generator construction antifriction ball-bearing element, sometimes differing in size within a unit, have commonly though not exclusively been employed. Though it has been recognized that the roller type bearings have higher load bearing capacity, their use has heretofore been restricted due to a tendency to skew in service. Any one of the three basic elements, i.e., wave generator, flexspline, or circular spline, may be an input and either of the other two may be an output. Regardless of particular arrangement, the known wave generator construction has employed anti-friction elements which have lacked positive, i.e., substantially no slip, driving connection with the other elements thereby failing to attain precise, uniformly constant ratio in speed increase or decrease.

SUMMARY OF THE INVENTION

In view of the foregoing it is an object of this invention to provide an improved mechanical wave generator assembly for positively interconnecting a source of rotary power to a flexspline.

A further object of the invention is to provide in an actuator a novel wave generator assembly incorporating planetary rollers in a manner tending to stabilize against skewing while insuring constant input-output ratio.

Another object of the invention is to provide a positive driving wave generator advantageous for use in a dynamic spline type harmonic drive actuator and in dual-ratio harmonic drive units.

To these ends, and as herein shown, a wave generator having unique driving relation with a flexspline provided with circumferential spline teeth comprises a rotary input member carrying a sun gear coaxial with the flexspline, and a pair of planetary roller pinions respectively diametrically meshing with the sun gear and the flexspline, the sum of the diameters of the sun and pinion gears being different than the diameter of the flexspline in its relaxed circular form, as measured between points corresponding to planetary roller contacts therewith, to impart predetermined radial deflection thereto.

In the embodiment selected for illustration, which is a dual-ratio construction, each of the planetary pinion rollers preferably carries on its axially opposite sides a radial load sustaining plain roller bearing having a diameter substantially equal to the pitch diameter of the planetary pinion, and a thin, hardened metal attenuator ring is disposed as a lining between the plain bearings and each one of the two differently toothed sets of external flexspline teeth which are to mesh at circumferentially spaced localities with circular splines. Roller skewing control rings preferably axially restrain the wave generator assembly.

BRIEF DESCRIPTION OF THE DRAWINGS

The foregoing and other features of the invention will now be more particularly described in connection with an illustrative dual-ratio harmonic drive assembly and with reference to the accompanying drawings thereof, in which:

FIG. 1 is a view in side elevation, with portions broken away, of a two-lobe or elliptoidal type actuator having a roller planetary wave generator, portions at the major and minor axes being broken away to show spline teeth relationships.

FIG. 2 is a view largely in diametric section at the major axis of the device shown in FIG. 1.

FIG. 3 is an enlarged detailed view of the planetary roller pinion teeth at the major axis fully meshing with internal flexspline teeth, and plain roller contact, and FIG. 4 is an enlarged detailed view of the planetary roller pinion teeth at the major axis meshing with sun roller gear teeth and indicating contact of a planet roller with a sun roller ring.

DESCRIPTION OF PREFERRED EMBODIMENT

Referring to FIGS. 1 and 2, it will be assumed that rotary input as from a shaft 10 is to rotate at least one of a pair of differently toothed output circular spline members 12,14. For convenience reference may be had to U.S. Letters Pat. No. 2,943,513 issued July 5, 1960 in the name of C. W. Musser, disclosing "Dual Strain Wave Gearing". A flexspline 16 is externally formed wit axially spaced sets of spline teeth 18,20 and is with provided with an integral set of internal teeth 22. For positively driving the flexspline 16 from the shaft 10 a novel roller planetary wave generator assembly generally designated 24 next to be described is provided.

The assembly 24 comprises a sun gear 26 secured on the shaft 10 as by a key 28 and having central peripheral gear teeth 30 on axially opposite sides of which preferably are plain thin sun roller rings 32,34. As shown in FIG. 2, thrust washers 36,36 respectively abut axially outer ends of the sun rings 32,34 and are axially secured by retaining rings 38,38 respectively. Diametrically opposite sun gear teeth 30 mesh with gear teeth 40,40 respectively formed on the peripheries of roller planetary pinions 42,42. As herein shown the latter are of substantially the same diameter as the sun gear 26, though it will be understood that they may differ therefrom considerably while nevertheless remaining of the same diameter as regards each other. The pinion teeth 40 on each pinion 42 are in mesh at the major axis designated X-X in FIG. 1 with the internal flexspline teeth 22, it being apparent that the sum of the pitch diameters of the pinions 42,42 and of the sun gear 26 are selected to exceed the internal pitch diameter of the flexspline 16 when in its relaxed circular form to provide predetermined radial deflection. FIG. 1 also shows that, at the minor axis, external flexspline teeth 18,20 are out of mesh with circular splines 12,14, while at the major axis the flexspline teeth 18,20 are fully meshing with the splines 12,14 by reason of the radial deflection imparted to the flexspline by the wave generator assembly 24.

It will be understood that the radial deflection in the illustrative embodiment is outward from the axis of the shaft 10, and that were the arrangement illustrated in its inverted form, the externally disposed wave generator would impose a radially inward or compressive deflection upon a flexspline to effect the meshing of teeth at circumferentially spaced localities at the minor axis.

Referring again to FIG. 2, each of the pinions 42 preferably has an axially projecting hub 44 for rotatably mounting with a loose fit (i.e., a clearance of about .002–.003 inches) a pair of plain rollers 46,46. These may, if preferred, be made integral with the pinions 42. The rollers 46 are preferably arranged to bear in planetary manner on the inside of hardened attenuator rings 48,48, respectively, which are substantially of a thickness corresponding to the depth of the pinion teeth 40. The rollers 46 likewise bear externally on the sun rings 32,34 respectively, thereby relieving the meshing pinion teeth 40 of radial load. For guiding the planetary rollers 46 and maintaining the attenuator rings 48 in assembled relation to the pinions 42 and the sun gear 26 a pair of rigid circular roller skew control rings 50 is provided in fixed axial spacing.

Each of the control rings 50 has an internal circular shoulder 52 of a diameter substantially equal to the minor axis internal diameter of the attenuator rings 48 at their opposite sides. The shoulders 52 extending axially within the rings 48 serve to insure that the minor axis dimension of the rotating flexspline is never less than intended as the wave shape is propagated. While the plain planetary rollers 46 in some applications may be omitted, since in the first instance the teeth 40,40 themselves react with the flexspline teeth 22 and tend to stabilize against skewing, the planetary rollers 46 serve additionally to mitigate against skewing in an effective manner while torque is exerted.

From the foregoing it will be clear that a compact, high load capacity wave generator construction is provided by the invention. The input rotation via the sun gear 26 positively drives through the meshing of major axis pinion teeth 40,40 therewith and with corresponding, diametrically opposed, internal flexspline teeth 22 to cause the lobar shape of the flexspline 16 to be rotated at constant speed about the axis of the shaft 10. As well understood in the art, one of the sets of flexspline teeth 18 or 20 may be stationary, i.e., anchored against rotation as a whole to provide a reaction means for enabling the circular spline 12 or 14 to be driven with greatly reduced and assuredly constant speed.

The dynamics of the planetary roller wave generator 24 are such that as the positive wave driving rotation is transmitted through the planetary pinions 42,42, the planet rollers 46,46 assume a major portion of the load and serve at the major axis portions to tend to align and stabilize gear tooth engagements against skewing. The planetary pinions 42,42, and the planet rollers 46,46 are well supported by the sun gear 26 and the sun rings 32,34 so that long bearing life may be expected.

Having thus described our invention, what we claim as new and desire to secure by Letters Patent of the United States is:

1. A wave generator for driving a harmonic drive flexspline provided with circumferential spline teeth, the wave generator comprising a sun gear coaxial with the flexspline, a pair of planetary roller pinions respectively diametrically meshing with the sun gear and the flexspline and radially deflecting the latter, the sum of the pitch diameters of the sun and pinion gears measured in a radial direction being different than the pitch diameter of the teeth of the flexspline in its relaxed circular form and substantially equal to the pitch diameter of the mating teeth of the flexspline, as measured between diametrically opposite points corresponding to planetary roller pinion contacts therewith to impart predetermined radial deflection thereto, and each of the planetary roller pinions having on axially opposite sides a plain planetary roller for bearing diametrically on a plain bearing surface of the sun gear and on an attenuator ring lining the interior of the flexspline adjacent to its internal gear teeth.

2. A wave generator as in claim 1 wherein a pair of roller skew control rings axially confine the wave generator elements in assembled relation to the flexspline, the control rings having, respectively, a circular peripheral portion of diameter substantially equal to the minor axis of the adjacent attenuator ring and disposed for potential engagement therewith.

3. In a harmonic drive actuator of the type having a rotary input shaft and a coaxial flexspline having at least first and second sets of teeth, the first of which sets meshes at spaced circumferential points with the circumferential spline teeth of a circular spline, a roller planetary wave generator driven by said shaft to ellipsoidally shape the flexspline and circumferentially advance the points of meshing between the first set of flexspline teeth and the circular spline, the wave generator comprising a sun gear secured for rotation with the shaft and having means for coaxially supporting on an axial side thereof a sun roller, a pair of diametrically opposed roller planetary gears meshing with the sun gear and with the second set of flexspline teeth, a flexible ring engaging and deflectible with a surface of the flexspline opposite to its first set of teeth, and a pair of plain planetary rollers respectively bearing, at diametrically opposite localities on the flexible ring and on said sun roller.

4. An actuator as set forth in claim 3 wherein a sun roller is carried by the sun gear on axially opposite sides thereof, and the roller planetary gears each carry on axially opposite sides thereof a plain planetary roller respectively having bearing on one of the two sun rollers.

5. An actuator as set forth in claim 3 wherein at least one skew control ring is provided having a portion with diameter of substantially the inside diameter at the minor axis of the flexible ring, the control ring being disposed for peripheral potential engagement by the flexible ring.

* * * * *